Patented June 16, 1953

2,642,459

UNITED STATES PATENT OFFICE 2,642,459

PRODUCTION AND PURIFICATION OF AMINO ACIDS

Halbert C. White, Midland, Mich., assignor to The Dow Chemical Company, Midland, Mich., a corporation of Delaware No Drawing. Application December 8, 1948, Serial No. 64,239

9 Claims. (Cl. 260—534)

This invention pertains to an improved method for the production and purification of alpha-amino-monocarboxylic acids. It pertains especially to certain new steps for separating alpha-amino acids, particularly water-soluble alpha-amino acids, from water-soluble inorganic salt impurities incident to manufacture of the amino acids.

It is known to prepare alpha-amino-monocarboxylic acids by reacting together, in an aqueous medium, an ammonium carbonate, a cyanide such as hydrogen cyanide or an alkali metal cyanide, and an aldehyde or ketone to form a hydantoin, separating the later, and hydrolyzing the hydantoin to form an alpha-amino acid or salt thereof. However, it is also known that a hydantoin may be hydrolyzed to form any of a number of different products, such as an amino acid, or a urea derivative, etc., the kind of principal product formed being dependent upon the hydrolysis conditions used, and that conditions suitable for the hydrolysis of a given hydantoin to form an alpha-amino-monocarboxylic acid frequently are unsuitable for the hydrolysis of another hydantoin to its corresponding alpha-amino-monocarboxylic acid.

Furthermore, when this known method is applied under conditions such as to form an alpha-amino-monocarboxylic acid, the latter is obtained together with various organic impurities and water-soluble inorganic salts such as alkali metal carbonates and chlorides, etc. Certain of the inorganic salts, particularly sodium chloride, are usually present as impurities in agents used in the synthesis and other salts, e. g., alkali metal carbonates, are formed in the process. The procedures heretofore employed for separation of the amino acids from the impurities have differed, depending upon the kind of amino acid being prepared, and in many instances have been inconvenient and costly. Separation of the water-soluble amino acids from the soluble inorganic salt impurities has been particularly troublesome. Accordingly, although a number of amino acids have been prepared on a laboratory scale in accordance with this known scheme of synthesis, the latter has not heretofore been satisfactorily applicable for the manufacture of many of the amino acids which, at least theoretically, may be prepared in accordance with such scheme.

In my co-pending application, Serial No. 708,461, filed November 7, 1946, now Patent No. 2,557,920, of which this application is a continuation-in-part, it is disclosed that hydantoins having the general formula:

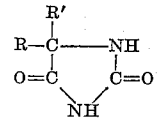

wherein R and R' each individually represents a member of the group consisting of hydrogen and monovalent organic radicals having a carbon atom thereof attached to the hydantoin nucleus, may be hydrolyzed to form a salt of an alpha-amino-monocarboxylic acid in good yield by heating the hydantoin together with an aqueous solution of an alkali metal hydroxide, or an alkali metal carbonate, under pressure in a closed vessel at a reaction temperature above 130° C. and preferably in the range of from 130° to 300° C. The hydantoins having the above-stated general formula are those formed by a reaction between an inorganic cyanide, an ammonium carbonate, and an aldehyde or ketone. The hydrolysis method of said co-pending application is applicable in producing an alpha-amino-monocarboxylic acid from any such hydantoin. The amino acid is formed directly as an aqueous solution of an alkali metal salt thereof, hence the hydrolysis may conveniently be carried out either batchwise, or in a continuous manner, e. g., by passage of the reaction mixture under pressure through a heated tubular autoclave.

Although the hydrolysis method of said co-pending application, Serial No. 708,461, may be applied to form soluble salts of any of a wide variety of alpha-amino-monocarboxylic acids in good yield, separation and purification of the amino acids to remove the aforementioned impurities incident to formation of the same has in many instances been difficult. The procedures heretofore employed for isolation of the water-soluble amino acids in a form substantially free of the aforementioned soluble inorganic salt impurities has been particularly difficult.

It is an object of this invention to provide an improved method for the production and purification of alpha-amino-monocarboxylic acids by reacting together an ammonium carbonate, an inorganic cyanide, and an aldehyde or ketone to form a hydantoin, hydrolyzing the latter with an aqueous alkali metal base solution to form a solution of an alkali metal salt of the amino acid together with the aforementioned water-soluble inorganic salt impurities, and isolating the amino acid from the reacted mixture. A further object is to provide such a method, whereby the conventional step of separating the hydantoin intermediate product from the solution in which it is formed may advantageously be omitted. Another object is to provide an improved combination of steps whereby an alpha-amino-monocarboxylic acid may readily and economically be produced in good yield and in a form of high purity from a hydantoin. A still further object is to provide certain new steps for the recovery, in purified form, of an alpha-amino-monocarboxylic acid from an aqueous solution comprising an alkali metal salt of the same together with water-soluble inorganic salt impurties incident to preparation of the amino acid. Other objects will be apparent from the following description of the invention.

I have found that an alpha-amino-monocarboxylic acid may readily be separated in purified form from an aqueous solution containing the same together with the aforementioned usual organic and inorganic salt impurities by evaporating, or distilling, water from the solution to obtain a residual solid mass, or aqueous slurry, of the salts; adding a lower alcohol, and water, if necessary, to the residue in proportions such that the alcohol corresponds to from 60 to 98, preferably from 80 to 90, per cent of the combined weight of the same and the water present, whereby the alkali metal salt of the amino acid is selectively dissolved, or extracted, from the slurry by the aqueous alcohol solution to leave the inorganic salt impurities in the residue; separating the resultant alcoholic solution and neutralizing it by addition of an organic carboxylic acid which, when converted to the sodium or potassium salt thereof, is readily soluble, e. g., to form an at least 2 weight per cent solution thereof, in an aqueous methyl alcohol solution of 90 weight per cent concentration, whereby the free amino acid is precipitated from the alcoholic solution; and separating the amino acid from the liquor. In this way, any of the alpha-aminomonocarboxylic acids formed by hydrolysis, with an aqueous alkali metal base solution, of hydantoins having the aforementioned general formula, may readily be recovered from the hydrolysis liquor in good yield and in a form of high purity.

The above new procedure for the isolation of an amino acid from an alkaline hydrolysis mixture containing the same in impure form is based on certain other discoveries, viz. that alkali metal salts of the alpha-amino-monocarboxylic acids are readily and rapidly dissolved by an aqueous alcohol solution of the above-stated concentration, whereas inorganic salt impurities incident to preparation of the amino acids are insoluble, or at most only sparingly soluble, in such alcoholic solution; and that the free amino acids are sparingly soluble in the aqueous alcohol solution, whereas the organic impurities incident to preparation of the amino acid are soluble in the solution.

For effective purification of the amino acid product it is important that the aqueous alcohol solution contain from 60 to 98 per cent of the alcohol, based on the combined weight of the alcohol and water in the mixture. Aqueous alcohol solutions of lower concentration usually dissolve an objectionable amount of the inorganic salt impurities together with the alkali metal salt of the amino acid product. An alcohol of greater than 98 per cent concentration frequently converts the alkali metal carbonate, or alkali metal bicarbonate, impurity to a slimy or gelatinous material, presumably by forming a double compound therewith. The presence of such slimy or gelatinous material interferes with precipitation of the inorganic salt impurities and also with filtration of the mixture by plugging the filter. In practice the aqueous alcohol employed for selective extraction of the alkali metal salt of the amino acid is preferably of from 80 to 90 concentration by weight. It is used in amount sufficient to dissolve at least 80 per cent of the salt of the amino acid without dissolving all of the salts present. Usually between 5 and 30, preferably between 8 and 15, parts by weight of alcohol, on an anhydrous basis, is used per part of amino acid (expressed as free amino acid) in the residue. By carrying the extraction out in a Soxhlet extractor so as repeatedly to reuse the same alcohol, the latter may be employed in proportions considerably lower than just stated.

I have further found that the above-mentioned steps for recovery and purification of an amino acid are effective in separating such product from the impurities normally present together with the intermediate hydantoin product, and that the conventional steps of separating the hydantoin from the aqueous solution in which it is formed, prior to hydrolyzing the hydantoin, may advantageously be omitted. According to the present invention, a crude aqueous reaction mixture comprising a hydantoin and its usual impurities may be treated directly with an aqueous alkali metal base and the hydantoin be hydrolyzed, to obtain a mixture from which an amino acid of high purity may be separated by the purification steps of the invention. Omission of the usual steps for separation and purification of the hydantoin intermediate product is of importance not only because of the reduction in the number of steps involved, but also because a considerable portion of the hydantoin usually is lost or destroyed during such steps for isolation of the same from the aqueous mixture in which it is formed, i. e., omission of said steps usually results in an improved yield of the amino acid product. As an illustration, it may be mentioned that it has not heretofore been possible to isolate the compound, hydantoin, from the crude aqueous mixture resulting from a reaction between formaldehyde, sodium cyanide and ammonium carbonate. However, I have found that such crude reaction mixture may be treated directly with an alkali metal base and be heated under pressure at 130° C. or above to form a hydrolysis mixture from which glycine of high purity may be recovered in a substantial yield by the purification procedure of the invention.

Inasmuch as procedures for reacting together, in an aqueous medium, an inorganic cyanide, ammonium carbonate or bicarbonate, and an aldehyde or ketone to form an aqueous solution of a hydantoin having the aforementioned general formula, and agents which may be employed in the reaction to form such hydantoins, are known, they need not be described in detail. However, it may be mentioned that the identity of the hydantoin is dependent upon the kind of aldehyde or ketone employed as a reactant and that the reaction results in a crude aqueous solution of a hydantoin together with organic and inorganic salt impurities. Heretofore, it has been usual practice to separate and purify the hydantoin prior to hydrolyzing the same. By such reaction, 5-methyl-hydantoin may be formed using acetaldehyde as a reactant, 5-ethyl-hydantoin may be formed from propionaldehyde, 5-propylhydantoin from butyraldehyde, 5-isopropyl-hydantoin from isobutyraldehyde, 5-butyl-hydantoin from valeraldehyde, 5-isobutyl-hydantoin from isovaleraldehyde, 5-phenyl-hydantoin from benzaldehyde, 5 - (beta - methylmercaptoethyl) hydantoin from gamma-methylmercaptopropionaldehyde; 5,5-dimethyl-hydantoin from acetone, and 5,5-diethyl-hydantoin from diethyl ketone, etc.

According to the present invention, a hydantoin, or preferably one of the above-mentioned crude aqueous reaction mixtures having an impure hydantoin dissolved therein, is treated with an alkali metal base such as sodium hydroxide, potassium hydroxide, sodium carbonate, or potassium carbonate, etc., in amount greater than that theoretically required for formation of an alkali metal salt of the alpha-amino-monocarboxylic acid obtainable by hydrolysis of the hydantoin. Two or more, preferably from 2 to 4, molecular equivalents of the alkali are usually employed per mole of the hydantoin, but the alkali may be used in a somewhat smaller proportion or in as great a proportion as desired. The aqueous alkali solution, in which the hydantoin is thus dissolved, may be of any desired concentration, but usually contains from 2 to 10 per cent by weight of the alkali. When treating an aqueous reaction mixture in which a hydantoin was formed, the alkali may be added as a solid or as a concentrated aqueous alkali solution.

The mixture is heated in a closed bomb or autoclave at temperatures above 130° C., e. g. from 130° to 300° C. or higher and preferably between 140° and 250° C., until the hydrolysis of the hydantoin is nearly complete. Since the hydrolysis to form an amino-monocarboxylic acid salt results in formation of one molecular equivalent of ammonia per mole of the hydantoin consumed, the extent of the reaction may be determined at any time by withdrawing an aliquot portion of the reaction mixture and determining the ammonia content thereof. When operating at a temperature of 150° C., the reaction usually is nearly complete in one-half hour. At higher temperatures it may be completed in a shorter time, e. g., in some instances in one minute. The mixture is advantageously cooled, e. g., to less than 130° C., as promptly as possible after completion of the hydrolysis reaction, since longer heating may result in decomposition of a portion of the product. When carrying the reaction out in a continuous manner, e. g., by passage of the mixture under pressure through a tubular autoclave and from the latter through a relief-valve, cooling may be effected by evaporation of water from the mixture as it flows from the autoclave to a zone of lower pressure. In this way, heat stored in the hydrolysis liquor may be used to concentrate the product.

After withdrawal from the bomb or autoclave, the hydrolysis mixture is concentrated by evaporation of water therefrom to obtain a solid mass, or preferably an aqueous slurry, of salts as a residue. Such evaporation may be carried out at atmospheric or at subatmospheric pressure, or even at a moderately increased pressure, e. g., up to 15 pounds per square inch gauge if desired. Evaporation of the hydrolysis mixture may be preceded by intervening steps of treating the hydrolysis liquor with a decolorizing agent, such as activated charcoal or a bleaching earth, and filtering, or such decolorizing treatment may be omitted or be deferred to a later stage in the process.

The residue is treated with a lower alcohol in amount corresponding to from 60 to 98, preferably from 80 to 90, per cent of the combined weight of the same and the water present. Any lower alcohol, or ether-alcohol, having not more than 5 carbon atoms in the molecule and free of other functional groups may be used for the purpose. Examples of such lower alcoholic compounds are methanol, ethanol, propanol, ethylene glycol, propylene glycol, methoxymethanol, ethoxymethanol, ethoxyethanol, and methoxypropanol, (i. e., the monomethyl ether of propylene glycol), etc. Methanol is preferably employed.

The inorganic salts are substantially insoluble in the added alcohol, but the alkali metal salt of the alpha-amino-monocarboxylic acid product dissolves, together with any organic impurities, in the aqueous alcohol. The inorganic salts are removed, e. g., by filtration or decantation. Thereafter, the alcoholic liquor is neutralized with a carboxylic acid which is of strength greater than that of the amino acid and which forms an alkali metal salt that is soluble in the alcoholic medium. A variety of carboxylic acids are known which are suitable for the purpose. Examples of such acids are formic acid, acetic acid, propionic acid, oxalic acid, succinic acid, and benzoic acid, etc.

By adding the organic acid to the alcoholic solution in amount such as to bring the mixture to a pH value of from 4 to 8, advantageously from 5 to 7, and preferably about 6, the amino acid is liberated from its alkali metal salt and precipitated, leaving the organic impurities and an alkali metal salt of the organic acid neutralizing agent in solution. The precipitate is removed, e. g., by filtration, washed with a lower alcohol, or other volatile organic liquid non-solvent for the amino acid, and dried. It is thereby obtained in a form of high purity. When necessary, the amino acid may be decolorized in usual ways, e. g., by forming a solution thereof, treating the solution with a decolorizing agent such as activated carbon or a bleaching earth, filtering, and recovering the amino acid from the filtrate. As hereinbefore indicated, the decolorization may be accomplished while the amino acid is dissolved as a salt in the hydrolysis mixture in which it is formed. Alternatively, it may be accomplished using the aqueous alcohol solution of such salt, or it may be accomplished after isolation of the amino acid product. In some instances, decolorization is not required and the decolorizing steps may be omitted.

The following examples describe certain ways in which the invention has been practiced, but are not to be construed as limiting its scope.

*Example 1*

Approximately 58 pounds (0.8 mole) of isobutyraldehyde was added gradually, over a period of 40 minutes, to a solution of 125 pounds of ammonium bicarbonate and 42 pounds of sodium cyanide in 80 gallons of water. The mixture was then heated at a temperature of 80° C. for 2.5 hours, whereby 5-isopropylhydantoin was formed. Thereafter, the mixture was boiled at atmospheric pressure, to vaporize water and unreacted ammonium bicarbonate therefrom, until the temperature of the residual mixture had increased to 102° C. Approximately 10.5 gallons of an aqueous sodium hydroxide solution of 50 per cent concentration was then added. The resultant solution was passed through a tubular autoclave, heated to about 170° C., at a pressure greater than the autogenous pressure and at a rate of flow such that the contact time, i. e., the time for passage of an infinitesimal portion of the mixture through the autoclave, was about 44 minutes. After discharge from the autoclave, the reaction liquor was evaporated by boiling at atmospheric pressure until its temperature had risen to 115° C. and the residue was an aqueous slurry of salts. The slurry was permitted to cool somewhat and 55 gallons of aqueous methanol, containing about 90 per cent by weight of methanol, was added. A considerable portion of the solids present in the slurry were thereby dissolved, but the inorganic salts present in the mixture were substantially insoluble and settled in solid form. The mixture was cooled to 40° C. and filtered to remove the solids, which consisted principally of sodium carbonate and sodium bicarbonate together with other salts such as sodium chloride. The filtrate was brought to a pH value of 5 by treatment with acetic acid, whereby the amino acid product, i. e., valine, was precipitated. The mixture was cooled to 20° C. and filtered to remove the valine and the latter was washed with methanol and dried. There was obtained 46 pounds of valine, the yield being 49 per cent of theoretical based on the isobutyraldehyde starting material.

*Example 2*

An aqueous solution of crude 5-ethylhydantoin was prepared by heating a mixture of 93 pounds (1.6 moles) of propionaldehyde, 84 pounds of sodium cyanide, 274 pounds of ammonium bicarbonate and 160 gallons of water at a temperature of 80° C. for 2.5 hours. Thereafter, the mixture was boiled to vaporize water and unreacted ammonium bicarbonate therefrom until the temperature had increased to 102° C. Approximately 30 gallons of an aqueous sodium hydroxide solution of 50 per cent concentration was added and the mixture was passed under pressure through a tubular autoclave heated to 170° C., at a rate of flow corresponding to a contact time of between 40 and 45 minutes. The effluent liquor from the autoclave was evaporated until the boiling temperature had risen to 125° C. and the residual material consisted of an aqueous salt slurry. One hundred ten gallons of methanol was added, whereby a large part, but not all, of the solid material in the slurry was dissolved. The alcoholic extract was separated from the undissolved salts. The residue was extracted with two further 15 gallon portions of methanol and the several alcoholic extracts were combined. The alcoholic liquor was then neutralized with acetic acid, as in Example 1, whereby the product, dl-alpha-aminobutyric acid, was precipitated. The product was separated by centrifuging the mixture, washed with methanol, and dried. There was obtained 106 pounds of white crystalline dl-alpha-amino-butyric acid having a melting point of 270°–272° C. The yield of crystalline alpha-aminobutyric acid was 64 per cent of theoretical, based on the propionaldehyde starting material.

*Example 3*

A mixture of 70 pounds (1.6 moles) of acetaldehyde, 274 pounds of ammonium bicarbonate, 84 pounds of sodium cyanide, and 180 gallons of water was heated to 80° C. for 2.5 hours, whereby 5-methylhydantoin was formed. Water and unreacted ammonium bicarbonate were vaporized by boiling the mixture until the temperature for boiling had risen to 102° C. Approximately 30 gallons of an aqueous sodium hydroxide solution of 50 per cent concentration was added. The mixture was passed under pressure through a tubular autoclave heated to 170° C. at a rate of flow corresponding to a contact time of between 40 and 45 minutes. The effluent liquor was evaporated until the boiling temperature had risen to about 125° C. and the residual material consisted of an aqueous salt slurry. The residue was extracted first with 110 gallons of methanol and thereafter with two 15 gallon portions of methanol and the extracts were combined. Inorganic salts such as sodium carbonate, sodium bicarbonate and sodium chloride, remained in the residue from the extraction. The alcoholic liquor was neutralized with acetic acid, whereby alanine was precipitated. The precipitate was removed by centrifuging the mixture, washed with methanol and dried. There was obtained 100 pounds of crystalline dl-alanine of high purity. The yield was 70 per cent of theoretical, based on the acetaldehyde starting material.

*Example 4*

Approximately 16.5 grams of an aqueous formaldehyde solution, containing 40 per cent by weight or 0.2 gram mole of formaldehyde, was added to a solution of 34.5 grams (0.437 mole) of ammonium bicarbonate, 10.5 grams (0.264 mole) of sodium cyanide, and 160 cc. of water. The mixture was heated at 80° C. for 3 hours and thereafter was evaporated to about 60 per cent of its initial volume by boiling the same at atmospheric pressure. Approximately 42 cc. of a 30 per cent aqueous sodium hydroxide solution was added and the mixture was heated in a closed iron bomb at 175° C. for 30 minutes. The bomb was then cooled and the mixture removed. The mixture was then decolorized with activated carbon, filtered, and the filtrate was evaporated nearly to dryness. The residual salt mixture, which comprised hydrates of sodium carbonate and sodium bicarbonate, was extracted with about 100 cc. of methanol, whereby the sodium salt of the glycine product was dissolved leaving the inorganic salts in the residue. Glycine was precipitated from the extract by bringing the latter to a pH value of 5 with acetic acid. The glycine was separated by filtration, washed with methanol, and dried. There was obtained 4 grams, or 26.5 per cent of the theoretical yield, of substantially pure glycine.

*Example 5*

One hundred grams of crude dl-alanine, containing 34 per cent by weight of ammonium chloride, was dissolved in 300 cc. of water and 112 grams of a 50 per cent aqueous sodium hydroxide solution was added. The solution was evaporated by boiling until a salt slurry, containing about 60 grams of water, remained. The slurry was treated with 400 cc. of methanol and the mixture filtered, leaving inorganic salts, e. g. sodium chloride, as the residue. The filtrate was neutralized with acetic acid to a final pH value of between 5 and 6, whereby alanine was precipitated. The precipitate was removed by filtration, washed with methanol and dried. There was obtained 52 grams of substantially pure alanine having an ash value of only 0.3 per cent.

*Example 6*

An aqueous solution of crude tryptophane, obtained by hydrolyzing 0.1 gram mole of 5-(3- indolylmethyl) hydantoin with aqueous sodium hydroxide, was divided into two equal portions. One portion was trated with activated carbon, filtered, and the filtrate was neutralized directly with acetic acid, and the tryptophane thus precipitated was filtered from the mixture, washed with methanol and dried. There was obtained 7.5 grams of tryptophane of good purity, but having a tan color. The other portion of the hydrolysis mixture was evaporated by boiling until an aqueous salt slurry remained. The slurry was extracted with two 100 cc. portions of methanol, and the combined extract was decolorized with activated carbon, filtered, and neutralized withT acetic acid to precipitate dl-tryptophane. The latter was filtered from the mixture, washed with methanol and dried. There was obtained 7 grams of white tryptophane of high purity.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method wherein an aqueous solution of a hydantoin, having the general formula:

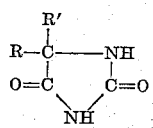

in which R and R' each individually represents a member of the group consisting of hydrogen and monovalent organic radicals having a carbon atom thereof attached to the hydantoin nucleus, is treated with an alkali metal base in amount corresponding to at least twice the molecular equivalent of the hydantoin, and the mixture is heated to hydrolyze the hydantoin and thus form an aqueous solution of an alkali metal salt of an alpha-amino-carboxylic acid, the steps of evaporating water from the hydrolysis mixture until dissolved salts are crystallized therefrom, extracting the alkali metal salt of the alpha-amino carboxylic acid from the residue with an aqueous alcohol solution, containing a lower alcohol in a concentration of from 60 to 98 per cent by weight, to leave inorganic salts in the residue, precipitating the alpha-amino-monocarboxylic acid from the extract by neutralizing the latter with a stronger carboxylic acid to leave the resultant alkali metal salt of the stronger carboxylic acid in solution, and separating the crystalline alpha-amino-monocarboxylic acid product.

2. A method, according to claim 1, wherein a soluble salt of a water-soluble alpha-amino-monocarboxylic acid is formed by the hydrolysis, and wherein the alcohol of the extractant is a saturated monohydric alcohol containing not more than three carbon atoms in the molecule.

3. A method, according to claim 1, wherein a soluble salt of a water-soluble alpha-amino-monocarboxylic acid is formed by the hydrolysis, the alcohol of the extractant is methanol, and the alpha-amino-monocarboxylic acid product is precipitated from the alcoholic extract by neutralizing the latter with acetic acid.

4. In a method for separation of an alpha-amino-monocarboxylic acid from an aqueous solution of an alkali metal salt of the amino acid together with a water-soluble inorganic salt impurity incident to production of the amino acid, the steps of evaporating water from the solution until the mixture is concentrated to a point at which dissolved salts are crystallized therefrom, extracting the alkali metal salt of the amino acid from the concentrated mixture with an aqueous alcohol solution, containing a lower alcohol in a concentration of from 60 to 98 per cent by weight, to leave the inorganic salt impurity in the residue, precipitating the alpha-amino-monocarboxylic acid from the extract by neutralizing the latter with a stronger carboxylic acid which is dissolved, as an alkali metal salt thereof, in the aqueous alcohol, and separating the crystalline alpha-amino-monocarboxylic acid product.

5. A method, according to claim 4, wherein the alpha-amino-monocarboxylic acid is one which is soluble in water and the alcohol of the extractant is a satuarted alcohol having not more than five carbon atoms in the molecule.

6. A method, according to claim 4, wherein the alpha-amino-monocarboxylic acid is one which is soluble in water, the alcohol of the extractant is methanol, and the carboxylic acid neutralizing agent is acetic acid.

7. A method, according to claim 6, wherein the alpha-amino-monocarboxylic acid is alanine.

8. A method, according to claim 6, wherein the alpha-amino-monocarboxylic acid is isoleucine.

9. A method, according to claim 6, wherein the alpha-amino-monocarboxylic acid is alpha-amino-butyric acid.

HALBERT C. WHITE.

References Cited in the file of this patent

UNITED STATES PATENTS

| Number | Name | Date |
|---|---|---|
| 427,565 | Gnehm | May 13, 1890 |
| 1,602,958 | Woo | Oct. 12, 1926 |
| 1,634,222 | Tressler | June 25, 1927 |
| 2,109,929 | Rigby | Mar. 1, 1938 |
| 2,225,155 | Cheronis | Dec. 17, 1940 |
| 2,384,817 | Chitwood | Sept. 18, 1945 |
| 2,446,192 | Pfister et al. | Aug. 3, 1948 |
| 2,456,742 | Shabica | Dec. 21, 1948 |
| 2,480,644 | Goldsmith, et al. | Aug. 30, 1949 |

FOREIGN PATENTS

| Number | Country | Date |
|---|---|---|
| 594,275 | Germany | Mar. 14, 1934 |
| 257,403 | Switzerland | Apr. 16, 1949 |

OTHER REFERENCES

Livak et al., J. Am. Chem. Soc., vol. 67, pp. 2218–2220 (1945).